May 27, 1958
L. MAURICE
2,836,728
PROTECTIVE ARRANGEMENTS FOR X-RAY APPARATUS
Filed Oct. 18, 1955
2 Sheets-Sheet 1
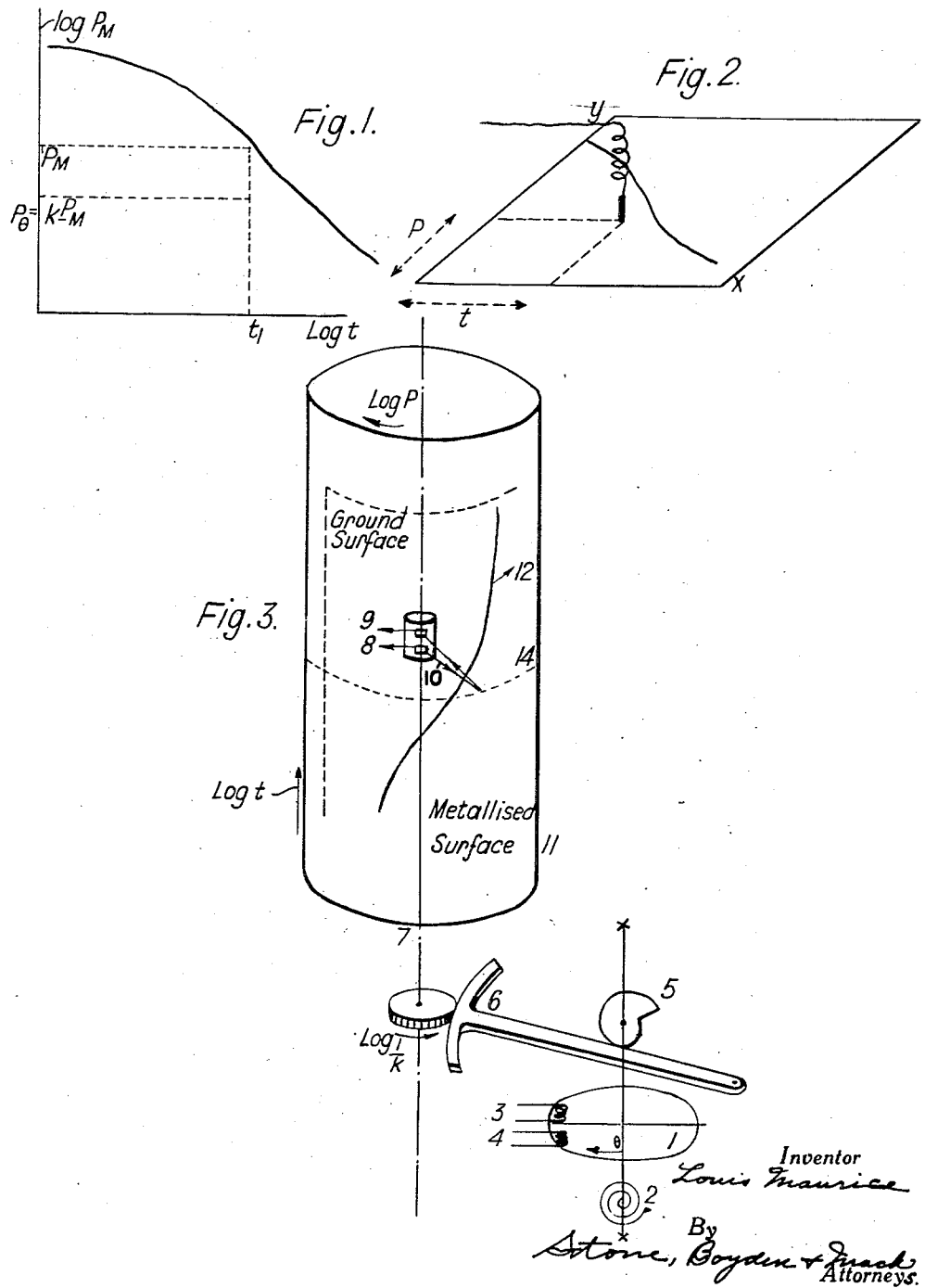

May 27, 1958  L. MAURICE  2,836,728
PROTECTIVE ARRANGEMENTS FOR X-RAY APPARATUS
Filed Oct. 18, 1955  2 Sheets-Sheet 2

Inventor
Louis Maurice
By
Stone, Boyden & Mack
Attorneys.

United States Patent Office 2,836,728
Patented May 27, 1958

2,836,728

PROTECTIVE ARRANGEMENTS FOR X-RAY APPARATUS

Louis Maurice, Paris, France, assignor to Compagnie Generale de Radiologie, Paris, France, a French body corporate Application October 18, 1955, Serial No. 541,257

3 Claims. (Cl. 250—103)

This invention relates to protective or safety arrangements for X-ray apparatus and will be described with reference to the accompanying drawings, in which:

Figure 1 is a charge diagram,

Figure 2 is a diagram of an arrangement for materialising the charge diagram,

Figure 3 is a view of one embodiment according to this invention,

Figure 4:
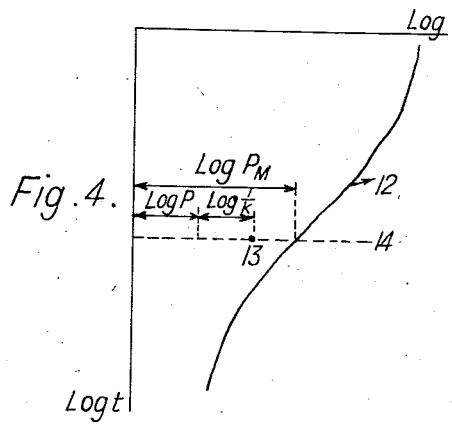
Figure 4 shows the developed diagram on the surface of the cylinder of Fig. 3.

It is known that the maximum power that can be dissipated on the anode of an X-ray tube is a function of the time during which this power is applied. This relation is expressed in particular by a charge diagram $P_M = f(t)$ on which the abscissae indicate the time $t$ and the ordinates the power $P_M$ (Figure 1). A radiographic system must thus satisfy the relation $P < P_M$ where P is the product of the voltage U by the current I.

Numerous arrangements are known which enable this charge diagram to be followed. These arrangements are based on two principles.

One consists in materialising the charge diagram $P_M = f(t)$ by a conducting material and by displacing on this surface an electrical contact as a function of time, according to the abscissae, and as a function of P according to the ordinates (Figure 2). For clarity of description this system will be called "system A."

The other principle consists in representing P by an electric voltage. A fraction of this voltage is derived by means of a potentiometer of which the position of the slider is a function of time, it being checked that this derived voltage does not exceed a fixed value. This system will be called "system B."

The arrangements according to these two principles are only valid for a single radiograph taken independently, that is to say with a cold anode.

There exist, on the other hand, arrangements which permit the mean temperature of the anode to be evaluated at each instant.

One of these arrangements, "system C," is constituted by a watt-hour-metric meter of which the disc is submitted to two couples. The motor couple, produced by a voltage coil and a current coil, moves the disc at a speed proportional to the power dissipated on the anode by the impact of the electrons. The opposing coupled produced, for example by a spring, moves the disc at a speed opposite to the first and proportional to the power removed by a radiation or conduction. This speed varies with the angle of rotation of the disc in such a manner that, with this couple acting alone, the rotation of the disc reproduces the experimentally determined cooling curve of the anode. Finally, the angle of rotation of the disc indicates, at any moment, the mean temperature $\theta$ of the anode or, which comes to the same thing, the energy which is stored therein in the form of heat.

Another arrangement, "system D," of measuring the temperature of the anode is based on the analogy which exists between the variations of the thermic charge and the variations of the electric charge of a capacity. A condenser is charged by a current proportional to the power dissipated on the anode. On the other hand, a resistance is shunted across the terminals of the condenser in such a manner that, not including any charge current, the variation of the voltage of the condenser with time reproduces the cooling curve of the anode. Finally, the voltage of the condenser indicates at any moment the temperature $\theta$ of the anode or its thermic charge.

The protection afforded by systems A, B, C and D, taken individually, is incomplete, and it is always possible to overload the tube.

It has already been stated that systems A and B are valid only for a cold anode, and consequently are not suitable for taking radiographs successively and at short intervals of time.

On the other hand, systems C and D only take account of the mean temperature of the anode and it is known that the instantaneous temperature of the focus can attain a destructive value, even though the mean temperature of the anode does not exceed an acceptable value.

The object of the present invention is to provide an improvement in the known arrangements which enable the charge diagram to be followed, such that they are valid not only for a single isolated radiograph, but for absolutely any succession of radiological actions.

This improvement is obtained by incorporating in the arrangements for evaluating the permitted power $P_M$ as a function of time (such as systems A or B), the mean temperature $\theta$ of the anode given by the arrangements such as systems C or D.

To take account of the initial temperature $\theta$ of the anode, it is necessary to limit the permitted power to a value $P\theta = kP_M$ with $k < 1$, $k$ being, for a given tube, a function of $\theta$.

Figure 6:
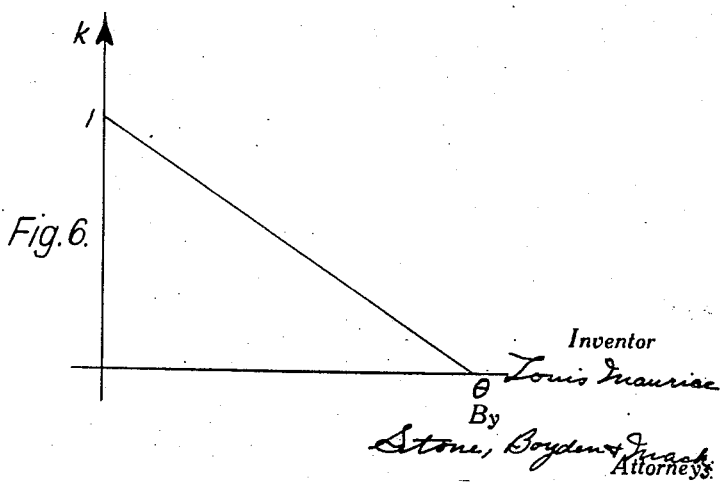
Figure 6 is a graph.

Preferably a linear relationship between K and $\theta$ is adopted (Figure 6).

The invention is carried into effect by combining, two-by-two, systems A or B on the one hand, and systems C or D on the other hand.

By way of non-limiting example, a combination of systems A and C and the combinations of systems B and D will be described.

In the case of system A the charge diagram is generally traced on a logarithmic scale. Under these conditions $P\theta = kP_M$ becomes:

$$\log P\theta = \log k + \log P_M$$

or knowing that $k < 1$ $$\log P\theta = \log P_M - \log \frac{1}{k}$$

To determine log $P\theta$, it is thus necessary to deduct from the value represented by log $P_M$ the value representing $$\log \frac{1}{k}$$

which is given by the arrangement for measuring the temperature of the anode.

To this end, the electric contact can be displaced towards the y increments of the quantity $$\log \frac{1}{k}$$

the surface materialising the diagram remaining fixed or by displacing the surface towards the $y$ decrements of the quantity $$\log \frac{1}{k}$$

the electric contact remaining fixed.

A different embodiment of this same principle consists in replacing the electric contact by a luminous beam and in collecting the reflected light by a photo-electric cell.

The following description, given by way of non-limiting example as to the modes of carrying out and applying the invention, will give a better understanding of the technical characteristics and advantages of the invention, the details of the embodiment also forming part of the invention.

The mean temperature $\theta$ is measured by a watt-hourmetric meter (system C) which is represented in Figure 3 by the disc 1, the voltage and current coils 3 and 4, and the opposing spring 2. The variation of $$\log \frac{1}{k} \text{ (function of } \theta)$$

is production by the cam 5 acting by means of a roller on the toothed sector 6. The angle of rotation of the axle 7 thus represents $$\log \frac{1}{k} \text{ (function of } \theta)$$

This axle carries a unit comprising a light source 8 producing a substantially radial beam 10 and a photoelectric cell 9.

A cylindrical tube 11 of glass or any other transparent material has its axis aligned with the axle 7. This cylinder is moved axially according to $\log t$ and rotatively according to $\log P = \log (U \times I)$ in the direction indicated in Figure 3. 12 is a curve traced on the cylindrical surface and represents the charge diagram $P_M = f(t)$. This curve separates the surface into two parts. To the left the surface of the glass is ground and to the right it is metalised to form a mirror. It will be clear that, under these conditions, when the light beam 10 falls upon the ground surface, it appears on the outside as a luminous spot, and when it falls on the metalised surface it is reflected and excites the cell 9 which itself operates a protection device.

Figure 4 shows the developed surface of the cylinder. It can be seen that so long as $$\log P + \log \frac{1}{k} < \log P_M$$

the luminous spot will appear on the ground surface and as soon as $$\log P + \log \frac{1}{k} > \log P_M$$

the light beam will be reflected and excite the cell 9.

Figure 5:
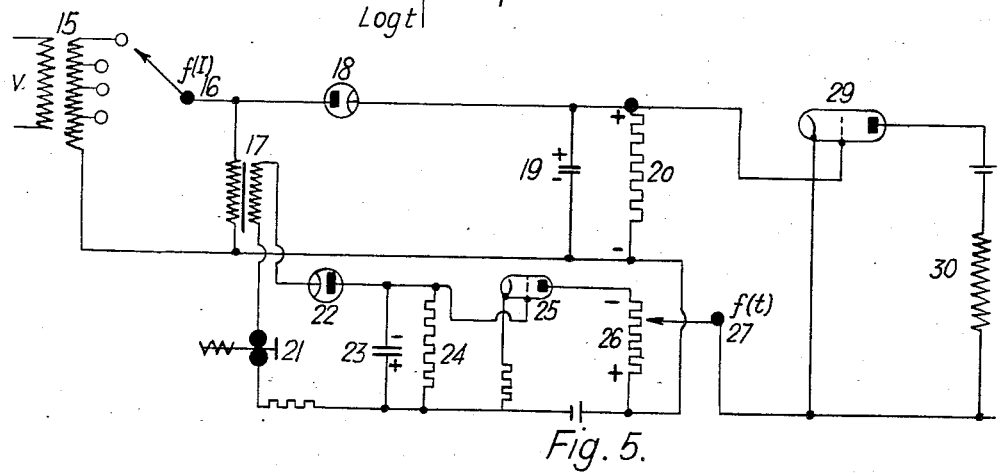
Figure 5 is a circuit diagram of another embodiment of this invention.

The invention can also be carried into effect by combining systems B and D. The following description of Figure 5, given by way of non-limiting example, will enable this combination to be better understood.

The transformer 15 (Figure 5) is fed by a voltage proportional to $U$. The switch 16 has its axis connected to the current controller in such a manner that the voltage at the terminals of the transformer 17 will be proportional to the product $U \times I$.

On the one hand, this voltage is rectified by the valve 18 and applied to the resistance 20. 19 is a filter condenser.

On the other hand, through the transformer 17 and the valve 22, the condenser 23 is charged by a current proportional to $U \times I$. This condenser represents the thermic capacity of the anode of system D. The resistance 24 represents the cooling. The contact 21 is closed at the same time as current is fed to the X-ray tube. Under these conditions the voltage at the terminals of 23 is proportional to the temperature $\theta$. This voltage is applied to the grid of the valve 25 in such a manner that, the relation between $k$ and $\theta$ being linear (Figure 6), the voltage at the terminals of the resistance 26 is proportional to $k$. A fraction of this voltage is taken off by means of a potentiometer 27 of which the shaft is connected to the time controller. The variation law of the potentiometer as a function of time is the same as that of $P_M$ $$P_M = f(t)$$

The fraction of the voltage taken off is thus finally proportional to:

$$k \times f(t) = k P_M$$

The difference $UI - kP_M$ is applied to the grid of the valve 29.

The condition of safety is assured so long as $UI < kP_M$. As as UI becomes greater than $P_M$, the plate current excites the relay 30 which interrupts the taking of radiographs.

I claim:

1. In combination with an X-ray tube and a source of anode current, a device for preventing overloading of said anode comprising a cylinder having its interior surface divided between light reflecting and non-reflecting areas by a curve representative of the permitted load as a function of time, a shaft mounted axially within said cylinder and having mounted thereon a source of radially projecting columnated light, a photo cell disposed on said shaft axially of said source, a watt-hour meter in the anode circuit, means associated with said meter for the rotation of said shaft to sweep said light beam circumferentially of said cylinder, and means associated with said photoelectric cell to interrupt the tube anode current upon passage of said beam from a reflective to a non-reflective area of said cylindrical surface.

2. In combination with an X-ray tube and a source of high potential anode current, a watt-hour meter connected in the anode circuit, means responsive to the heat dissipation of the anode to oppose rotation of said meter, and means responsive to the opposed displacement of said meter to control anode load as a function of time, said last mentioned means comprising a photoelectric scanning device, driven by said meter to scan a cylindrical surface divided between reflecting and non-reflecting areas and operatively connected to interrupt anode current upon passage from one area to the other.

3. In combination with an X-ray tube and a source of high potential anode current, a watt-hour meter connected in the anode circuit, means responsive to the heat dissipation of the anode to oppose rotation of said meter, and means responsive to the opposed displacement of said meter to control anode load as a function of time, said last mentioned means comprising a photoelectric scanning device, axially adjustable to compensate for varying load characteristics and driven by said meter to scan a cylindrical surface divided between reflecting and non-reflecting areas and operatively connected to interrupt anode current upon passage from one area to the other.

References Cited in the file of this patent

UNITED STATES PATENTS

| 1,976,298 | Richter | Oct. 9, 1934 |
| 2,199,071 | Gale | Apr. 30, 1940 |
| 2,571,013 | Cobean | Oct. 9, 1951 |

FOREIGN PATENTS

| 42,129 | Netherlands | Dec. 15, 1937 |
| 143,653 | Australia | Oct. 3, 1951 |